(12) United States Patent
Deuber

(10) Patent No.: US 9,068,652 B2
(45) Date of Patent: Jun. 30, 2015

(54) EXTRACTION DEVICE AND SEALING SYSTEM

(75) Inventor: Louis Deuber, Richterswil (CH)

(73) Assignee: LUNA TECHNOLOGY SYSTEMS LTS GMBH, Wallisellen (CH)

( * ) Notice: Subject to any disclaimer, the term of this patent is extended or adjusted under 35 U.S.C. 154(b) by 309 days.

(21) Appl. No.: 13/877,666

(22) PCT Filed: Oct. 8, 2010

(86) PCT No.: PCT/CH2010/000249
§ 371 (c)(1),
(2), (4) Date: Apr. 30, 2013

(87) PCT Pub. No.: WO2012/045184
PCT Pub. Date: Apr. 12, 2012

(65) Prior Publication Data
US 2013/0220138 A1    Aug. 29, 2013

(51) Int. Cl.
*A47J 31/00* (2006.01)
*F16J 15/02* (2006.01)
*A47J 31/36* (2006.01)
*A47J 31/40* (2006.01)

(52) U.S. Cl.
CPC .............. *F16J 15/02* (2013.01); *A47J 31/3628* (2013.01); *A47J 31/3633* (2013.01); *A47J 31/3695* (2013.01); *A47J 31/407* (2013.01)

(58) Field of Classification Search
CPC .............. A47J 31/3628; A47J 31/3623; A47J 31/3633; A47J 31/3638

USPC ................................ 99/302 P, 297, 289 R, 295
See application file for complete search history.

(56) References Cited

U.S. PATENT DOCUMENTS

| | | | |
|---|---|---|---|
| 2,209,235 A | 7/1940 | Nathan | |
| 6,584,888 B2* | 7/2003 | Cortese | 99/289 R |
| 6,997,103 B2* | 2/2006 | Shaw et al. | 99/295 |
| 8,210,097 B2* | 7/2012 | Versini | 99/295 |
| 8,770,095 B2* | 7/2014 | Pecci et al. | 99/295 |
| 8,904,922 B2* | 12/2014 | Pagano | 99/295 |

FOREIGN PATENT DOCUMENTS

| | | |
|---|---|---|
| DE | 60126945 | 11/2007 |
| GB | 1083451 | 9/1967 |
| JP | 3-58232 | 6/1991 |
| JP | 2002-188725 | 7/2002 |
| WO | 2009/090201 | 7/2009 |
| WO | 2010/092543 | 8/2010 |

* cited by examiner

*Primary Examiner* — Reginald L Alexander
(74) *Attorney, Agent, or Firm* — Rankin, Hill & Clark LLP

(57) ABSTRACT

An extraction apparatus includes a brewing module for receiving a capsule with an extraction material. The brewing module includes a first brewing module part and a second brewing module part, the second brewing part being movable relative to the first brewing part. The first and the second brewing module parts form a discharge device for the discharge of an extraction product out of the capsule, and an introduction device for introducing an extraction fluid into the capsule. A sealing system for such an extraction apparatus includes a seal having at least one circumferential sealing lip and/or one circumferential sealing bead, which bears on a surface of the capsule in a line-like or strip-like manner and presses the capsule wall against the capsule interior.

14 Claims, 5 Drawing Sheets

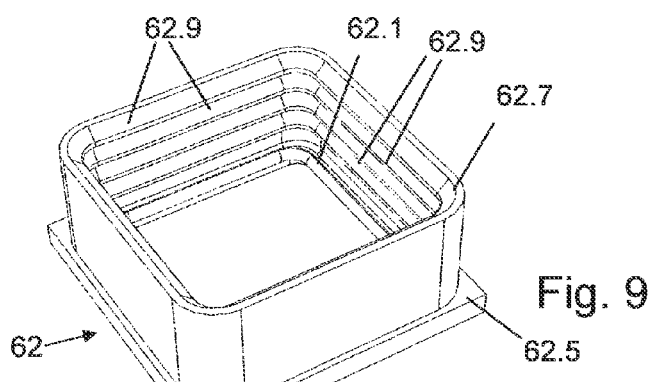
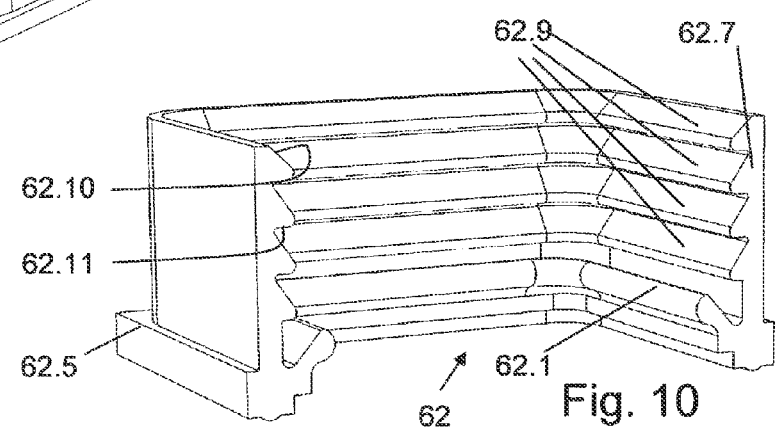
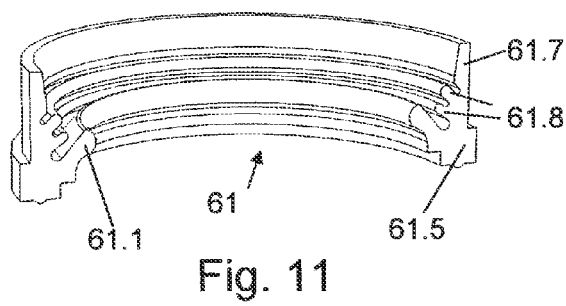
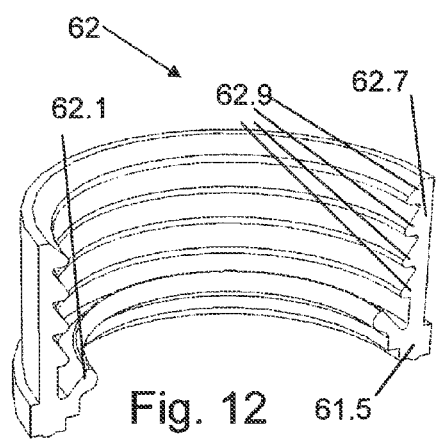

EXTRACTION DEVICE AND SEALING SYSTEM

BACKGROUND OF THE INVENTION

1. Field of the Invention

The invention relates to extraction apparatus for preparing drinks or likewise, from an extraction material contained in a capsule, for example ground coffee. It also relates to a sealing system for such an extraction material and to a brewing module.

2. Description of Related Art

Extraction apparatus for preparing drinks or likewise from an extraction material present in a portion packaging are known for example as coffee machines or espresso machines and are enjoying an increasing popularity. In many corresponding systems, the portion packagings are designed as capsules, in which the extraction material is sealed in an airtight manner. For the extraction, as a rule the capsule or a separate container present in the inside of the capsule is pierced at two sides lying opposite one another. At the first side, an extraction fluid—generally hot water—is introduced by way of an injector device (introduction device). At the second side, the extraction product is led out of the capsule by way of an extraction device (discharge device). This is affected in a so-called brewing module. Such a brewing module comprises a brewing chamber, in which the capsule is received. Brewing modules, with which the capsule is inserted into the brewing module, and the brewing chamber is closed, are particularly popular, wherein with the renewed opening of the brewing chamber after the brewing procedure, the capsule is automatically removed from the brewing chamber and is ejected into a capsule container. Such brewing modules with an automatic capsule ejection are often designed as horizontal brewing modules, i.e. the capsule feed is effected from above, the closure of the brewing chamber is a horizontal relative movement of two brewing chamber parts, the brewing fluid flows essentially horizontally and the capsule container is formed below the brewing chamber. Likewise known are so-called piston carrier systems, with which the brewing chamber is formed between a water injector and a piston with a pivot lever.

On brewing the drink, the extraction fluid is often introduced into the capsule under a large pressure of for example 10-20 bar. Thereby, it is important for the extraction fluid to get through the capsule to the second side and for it not to flow past the capsule due to the high pressure. For this reason, the capsule must be sealed with respect to the injector device and the extraction device, wherein these seals can be combined.

Capsules of common apparatus have a conical beaker-like basic shape with a laterally projecting collar. This collar according to a first common procedure has an important function on sealing. An annular seal bears on the end-surface in the region of the collar, wherein the collar is likewise supported by a likewise annular counter-element, in a manner such that the collar is clamped between the seal and the counter element. According to a second common procedure, the sealing is affected by a snug fit, by way of the conical lateral surface of the beaker, which is circular in cross section, being pressed in a surfaced manner against a correspondingly equally shaped conical surface of a brewing chamber receiver. The collar of the beaker is necessary for holding and positioning the capsules on introducing the capsule into this brewing chamber receiver.

These two procedural manners have proven their worth, but they are only suitable for capsules of the mentioned conical beaker shape with a collar. This shape has the disadvantage that it takes up rather a lot of space in storage and transport and besides that, depending on the material, the collar can be easily damaged during mechanical use.

BRIEF SUMMARY OF THE INVENTION

It is the object of the invention, to provide an extraction apparatus with a sealing system, which does not depend on this beaker shape with a circumferential collar, is suitable for different capsule shapes and different brewing chamber mechanisms and which nevertheless assumes the sealing function reliably.

This object is achieved by the invention, as is defined in the patent claims.

An extraction apparatus of the type discussed here is in particular suitable for brewing a drink. It is a coffee machine, for example. The extraction apparatus comprises a brewing module for receiving a capsule with an extraction material. The brewing module comprises a first brewing module part and a second brewing module part, which is movable relative to the first brewing module part, wherein the first and the second brewing module part form a discharge device for the discharge of the extraction product out of the capsule, and an introduction device for introducing an extraction fluid into the capsule, wherein the introduction device comprises at least one piercing tip. The extraction apparatus further comprises a fluid pump for pumping extraction fluid and, optionally, a heating for heating the extraction fluid before introduction into the capsule. The extraction fluid in many cases is water, and if the extraction apparatus is a coffee machine or tea machine, it is also called "brewing fluid".

Such an extraction apparatus according to the invention is essentially characterised in that it comprises a sealing system with an elastically deformable seal which surrounds the piercing tip or the piercing tips of the introduction device and which comprises a seal collar which encompasses the capsule in a positioning and holding manner and at least one circumferential sealing lip and/or a circumferential sealing bead, said sealing lip and/or sealing bead bearing on a surface of the capsule in a line-like or strip-like manner and pressing the capsule wall against a capsule interior. With regard to the capsule wall being pressed against the capsule interior, this means that no supporting counter-element is present at the location of the sealing lip or of the sealing bead, but that the capsule wall by way of the sealing lip or the sealing bead in contrast is quasi pressed against the capsule filling.

Thereby, the seal is held in the extraction apparatus, (in particular in the brewing module of this) such that the exact position of the capsule is determined by the seal. In particular, in contrast to the state of the art, the extraction apparatus is free of a seat which is formed by an in particular non-elastically deformable element which partly surrounds the capsule and bears on a circumferential wall in a surfaced manner. In preferred embodiments, it is in particular free of non-elastic elements which bear on the capsule wall and which bear on the capsule, between an injection plate of the introduction device (plate, from which the piercing tips project and against which the capsules is pressed on piercing) and the seal.

This idea is based on the rather surprising realization that, with the pressures required for brewing a drink, for example an espresso, the use of such a circumferential lip seal is possible in order to attain the necessary sealing function, without the need for an anvil or snug fit.

A seal of the described type is present at the introduction device. Such an injection-side seal has the purpose of preventing brewing fluid to be introduced into the capsule from taking a different path other than being pressed into the capsule. The pressures occurring at the injection side are particularly large. The invention is particularly advantageous in combination with injection systems, in which, as described in detail in PCT/CH2010/000098, the brewing fluid is not injected through a piercing tip provided with a channel. In contrast, with such systems a piercing tip serves for piercing the capsule. The brewing fluid is introduced into the capsule in the proximity of the piercing tip and through the opening produced by the piercing tip, but past the piercing tip. In particular, an introduction opening for the brewing fluid can then lie in a plane, on which the capsule wall bears. Such systems have been found to be particularly favourable with regard to piercing systems, and in particular with regard to piercing systems of the more environmentally friendly capsules with a plastic wall. They however have the effect that the entire pressure of the brewing fluid bears on the sealing system, unlike the case on injecting through a tip directly into the inside of the capsule, where a part of the pressure is damped by the extraction material.

In addition, the sealing system comprises preferably also on the side of the discharge device a seal of the described type with at least one circumferential sealing lip and/or a circumferential sealing bead, said lip and/or bead bearing in a line-like or strip-like manner on a surface of the capsule and pressing the capsule wall against the inside of the capsule. Preferably, such an extraction-side seal also comprises a seal collar surrounding the capsule in a positioning manner. Such an extraction-side seal surrounds extraction-side piercing tips with assigned discharge openings which for example are likewise locally separated from the piecing tips, and has the purpose of feeding fluid exiting from the capsule to the envisaged conduit and for preventing it taking another path past the capsule.

The injection-side seal, and optionally, also the extraction-side seal are fastened on the introduction device, or the discharge device respectively, and in a movement of the two brewing module parts relative to one another (thus in particular of the introduction device relative to the discharge device) the seal or seals are moved along with them.

The injection-side seal and, as the case may be, also the extraction-side seal is elastic, in particular is manufactured from an elastomer. Materials with Shore hardnesses between 50 and 90 Shore A, in particular between 70 and 85 Shore A have been found to be particularly favourable for the injection-side seal. The hardness of an extraction-side seal can be the same as the hardness of the injection-side seal, or it can be lower. In particular, the extraction-side seal can have a Shore hardness of between 55 and 80 Shore A.

It is often advantageous if the seal is designed such that at least one sealing lip and/or a sealing bead encompasses the capsule along a circumferential surface and thereby on account of its elasticity is pressed against the capsule wall in such a manner that the capsule is held by the seal due to this bearing contact of the sealing lip(s) or the sealing bead(s).

A construction which comprises a plurality of circumferential sealing lips and/or sealing beads, thus at least two sealing lips, at least in each case one sealing lip and one sealing bead, or at least two sealing beads, has been found to be likewise particularly favourable, depending on the situation (in particular for the injection-side seal, but in embodiments as the case may be also for the extraction-side seal). The sealing lip(s) or sealing bead(s) thereby due to their elasticity press the capsule wall against a capsule interior, wherein a recess is arranged in each case between two consecutive sealing lips or sealing beads, in a manner such that a circumferential cavity is formed between the consecutive sealing lips or sealing beads and the capsule, in the operating condition.

With circularly cylindrical or conical capsules, the circumferential surface is formed by the lateral surface and with a cube-shape or parallelepiped shape by four peripheral sides (which in many embodiments are different from the side/the sides, through which the brewing fluid is injected and through which the brewed drink is discharged out of the capsule). A sealing lip or a sealing bead can bear on the capsule wall also at a location, in which the capsule wall has a non-constant angle to a capsule axis and brewing chamber axis, for example at the location of a transition between an end-face and the circumferential surface.

In combination with the ideal of encompassing the capsule along a circumferential surface, it is particularly favourable for the injection-side seal and/or for the extraction-side seal if at least one of the circumferential sealing lips or sealing beads is pressed against an end-face of the capsule, and at least one of the circumferential sealing lips or sealing beads is pressed against a circumferential surface.

The brewing chamber of an extraction apparatus according to the invention can have different shapes, in particular circularly cylindrical or cube-shaped (such as for example in PCT/CH2010/000097). Also conical—beaker-like capsules—with or without edge and with or without curvature of one of the end-faces (of a surface in which the capsule is pierced) inwards—are not ruled out.

According to one design, the lip or at least one of the lips can project inwards to the location of the fluid injection or fluid extraction, in particular if it bears on the capsule in the region of the end-face of this. The fluid pressure would then press the sealing lip additionally to the effect to the elasticity of this, onto the capsule, for example in the region of the end-face.

In combination with a seal collar which encompasses the capsule in a circumferential manner, then such an inwardly projecting sealing lip provided for bearing on the end-face can project inwards from the collar in the proximal region.

Such a sealing lip, which in particular projects inwards in the region of the end-face, is preferably wing-like or lobular in cross section.

A design of a seal with an inwardly projecting lip in the region of the end-face and a plurality of sealing lips or sealing beads with cavities therebetween in the region of the circumferential surface and/or in the transition between the end-face and the circumferential surface is particularly preferred for the injection-side seal and/or for the extraction-side seal. This affects a multi-stage seal, which in particular on the injection side is advantageous, since there the pressure is greatest and the sealing is a particular challenge. The inwardly projecting lip is thereby the first step, which is arranged where a large pressure prevails, which on account of the design of the sealing lip supports the sealing effect. The lips/beads, which are present in the region of the circumferential surface or in the transition, serve as further steps, which, together with the cavities lying therebetween, prevent residual fluid portions, which pass the first stage, for example during the build-up of pressure or possibly also thereafter, from being able to exit. Moreover, they effect a stepwise pressure reduction in case that the first stage does not withstand the complete pressure difference between the fluid pressure and the surrounding pressure.

In particular, the injection-side seal is preferably designed such that it alone, on account of its elasticity and without an additional clamping force of the capsule, holds this in an encompassing manner, so that the force for pulling the capsule out of the encompassing seal exceeds the intrinsic weight of the capsule, and specifically preferably also when the capsule is completely impregnated with fluid.

A design which is saw-tooth in cross section has been found to be particularly favourable as a shape of sealing lips in the region of the seal collar encompassing the capsule, for the injection-side seal. Such a saw-tooth shape unifies the effect of an inwardly projecting lip which due to the occurring pressure increasing the sealing effect, is increasingly pushed against the capsule, and the clamping effect, by way of it having a greater stiffness in comparison to an inwardly projecting, lobular lip. This greater stiffness permits a reliable, encompassing retention of the capsule.

After the brewing procedure, the brewing chamber is opened, in particular due to the relative movement of the introduction device and the discharge device, and the capsule is ejected, for example into a capsule container which is envisaged for this. An extraction apparatus according to the invention, then according to a group of preferred embodiments, is designed such that a seal encompassing the capsule—in particular the injection-side seal—on opening the brewing chamber, holds the capsule and thus has the effect that the capsule is pulled out of the oppositely lying (in particular the extraction-side) piercing tips and, as the case may be, out of the encompassing seal which is present on the respective other side (in particular extraction side). Additionally, the extraction apparatus comprises a wiper means, by way of which after a part of the relative movement, the capsule is held back relative to the moving part (in particular introduction device), by which means it can be released from the encompassing seal and can fall downwards for example. The wiper means can for example comprise webs which project laterally inwards into the brewing chamber and which during the relative movement are moved inwards or which on account of a bead, a conicity or other deviation from the purely cylinder shape of the capsule, only engage on the capsule after a part of the relative movement.

A coffee or tea brewing system, apart from an extraction apparatus of the type described in detail in this text and in the drawings, also comprises a portion capsule with an extraction material. The portion capsule is particularly of the type with a plastic wall which directly surrounds the extraction material, thus without stabilising parts or parts acting as a filter, which lie therebetween, i.e. the capsule consists of the capsule wall and the extraction material. A specially preferred capsule wall material is polypropylene (PP). Other materials are also conceivable, in particular other foodstuff-compatible plastics. The wall thickness in particular with polypropylene capsules is preferably between 0.1 mm and 0.5 mm, for example between 0.2 mm and 0.4 mm, in particular between 0.25 mm and 0.35 mm. The capsule after the filling of the capsule body with the extraction material is closed by a cover, in particular with a method, with which a projecting edge of the capsule body and the cover are separated away simultaneously with the welding. The capsule has a circumferential welding brow on account of this, which acts in a reinforcing manner. The seal or one of the seals can be matched to this and, for example, comprise sealing lips bearing on the capsule on both sides of the welding brow.

BRIEF DESCRIPTION OF THE DRAWINGS

Embodiment examples of the invention are hereinafter described by way of drawings. In the drawings, the same reference numerals indicate the same or analogous elements. The drawings show elements, which partly correspond to one another, in sizes, which are different from figure to figure. There are shown in:

FIG. 9 is a perspective view of a further embodiment of a seal which is particularly suitable for the introduction device;

FIG. 10 is a sectional elevation view of the seal according to FIG. 9;

FIG. 11 is a sectional elevation view of a seal that is not suitable for cube-shaped, but instead for example cylindrical or conical capsules FIG. 12 is a sectional view of a further seal which is not suitable for cube-shaped, but instead for example cylindrical or conical capsules;

DETAILED DESCRIPTION OF THE INVENTION

Figure 1:
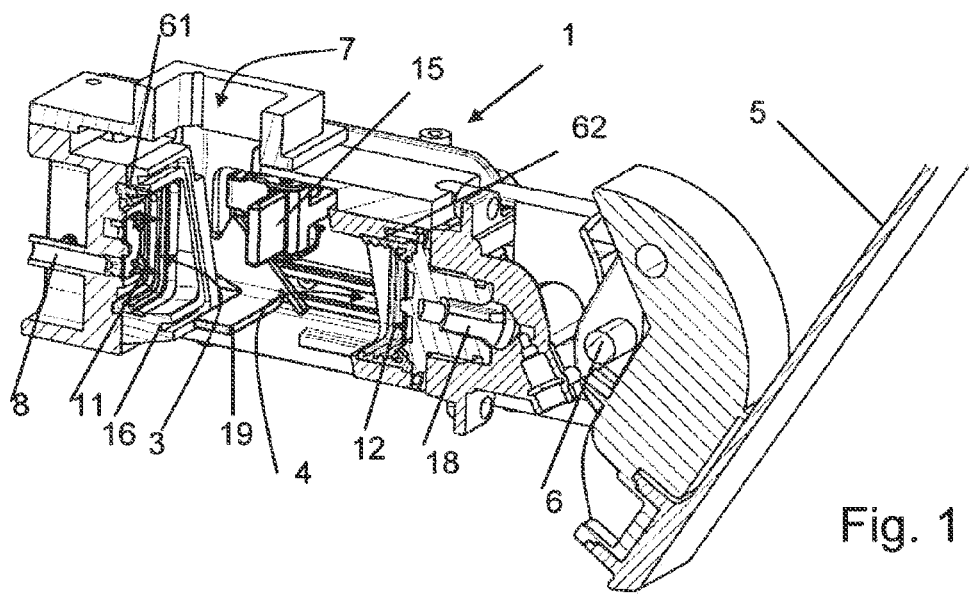
FIG. 1 is a partial sectional elevation view of a brewing module sectioned along a longitudinal plane.

The brewing module 1 according to FIG. 1 is of the "horizontal brewing module" type. In the manner known per se, it comprises a discharge device 3 and an introduction device 4 which are fastened or guided on a structure and are displaceable relative to one another by way of an operating lever 5 pivotable about a pivot pin 6. In the shown embodiment, the introduction device 4, by way of a pivot movement of the operating lever 5, is displaceable to the front in the direction of the discharge device 3, whilst the latter is unmovable relative to the structure.

Figure 2:
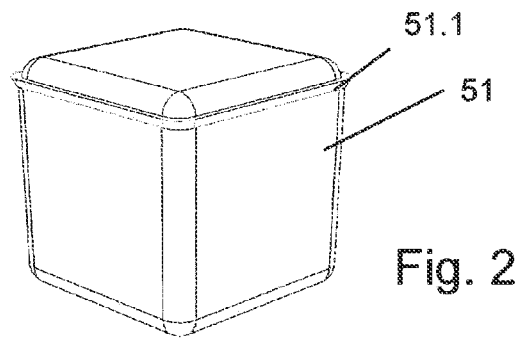
FIG. 2 is a perspective view of an approximately cube-shaped capsule.
Figure 3:
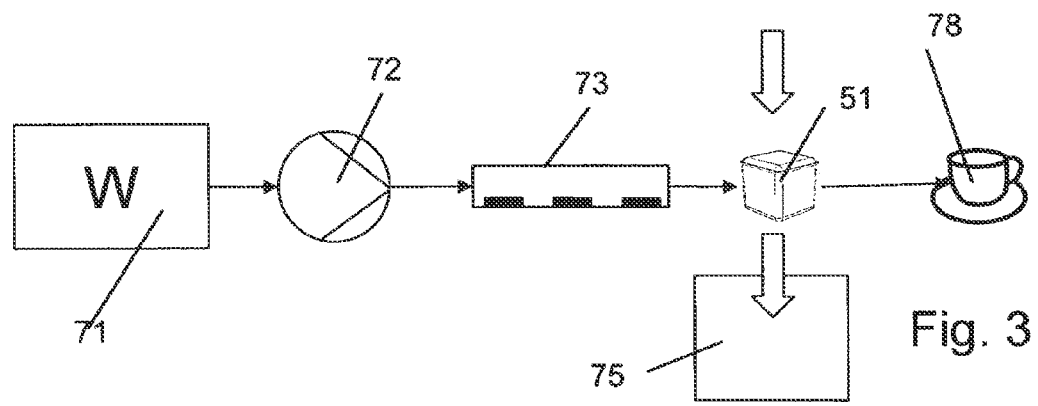
FIG. 3 is a schematic drawing of a coffee machine.

The insert opening 7 for inserting a cubic portion capsule is well visible in FIGS. 1 and 3. One example of such a cuboid, approximately cube-shaped portion capsule 51 is drawn in FIG. 2. The capsule 51 is of the capsule type as is described in detail in the patent application PCT/CH2010/000097 . This patent application PCT/CH2010/000097 is referred to with regard to the nature of such a capsule with a plastic wall, and with regard to its manufacture—preferably the capsule is closed in a method, with which a projecting edge is separated simultaneously with the welding. In FIG. 2, apart from the characteristic capsule shape, one can also see a circumferential welding brow 51.1, which arises with the mentioned method and can act as an additional stiffening of the capsule.

Embodiments of the extraction apparatus according to the invention are particularly matched to capsules made of plastic. One material for capsules, which is particularly preferred with regard to this, is polypropylene (PP). Other materials are also conceivable, in particular other foodstuff-compatible plastics. The wall thickness in the design as a plastic capsule, in particular as a polypropylene capsule, is preferably between 0.1 mm and 0.5 mm, for example between 0.2 mm and 0.4 mm, in particular between 0.25 mm and 0.35 mm.

The insert opening 7 is designed in the structure, is located in the region of the discharge device 3 and, like this device, remains stationary during a movement of the operating lever 5. The insert opening 7 can be slightly conically tapering to the bottom, in order to produce a centering effect on the capsule 51 during insertion, without the danger of a jamming of the capsule becoming too large.

In the operating condition, the brewing module serves as a brewing module of a coffee machine. A coffee machine according to the invention, with a brewing module, as is shown in FIG. 3 in a schematic manner, apart from the brewing module comprises a water tank 71, a pump 72 for feeding brewing water to the introduction device 4, and a water heating device 73 (for example water heater). A capsule container 75, in which the capsules 51 fall or are transported after the brewing process, is arranged below the brewing module.

The supply of the heated water to the introduction device 4 is affected via flexible water conduit sections (flexible tubes) and via supply channels 18. The introduction device moreover comprises at least one piercing tip 12 with an assigned feed opening, so that the capsule can be pierced and can be supplied with the extraction fluid through the feed opening. The coffee machine furthermore for example comprises a capsule container 75 which is arranged below the brewing chamber and in which the capsules are automatically ejected after the brewing procedure, by way of lifting the operating lever 5.

The discharge device 3 is also provided with at least one piercing tip 11 and an assigned discharge opening. Furthermore, depending on the configuration, a discharge conduit is also present, with which coffee (or likewise) exiting from the exit 8 of the discharge device is led such that it trickles into a cup 78 put down at the envisaged location.

The piercing tips 11 of the discharge device 3 are surrounded by an extraction-side seal 61, and the piercing tips of the introduction device 4 are surrounded by an injection-side seal 62. These seals are hereinafter described in more detail. Likewise shown is a wiper element 15 whose function is likewise yet to be described hereinafter.

The piercing tips and elements, on which they are fastened, can be designed according to the mentioned patent application PCT/CH2010/000098, which is explicitly referred to here.

The approximately cube-shaped capsule 51 which is inserted through the insert opening 7 when the brewing chamber is open (FIG. 1), is held in the brewing module in a supported manner by a support portion 16 of the discharge device 3 and a movable capsule support 19.

Figure 4:
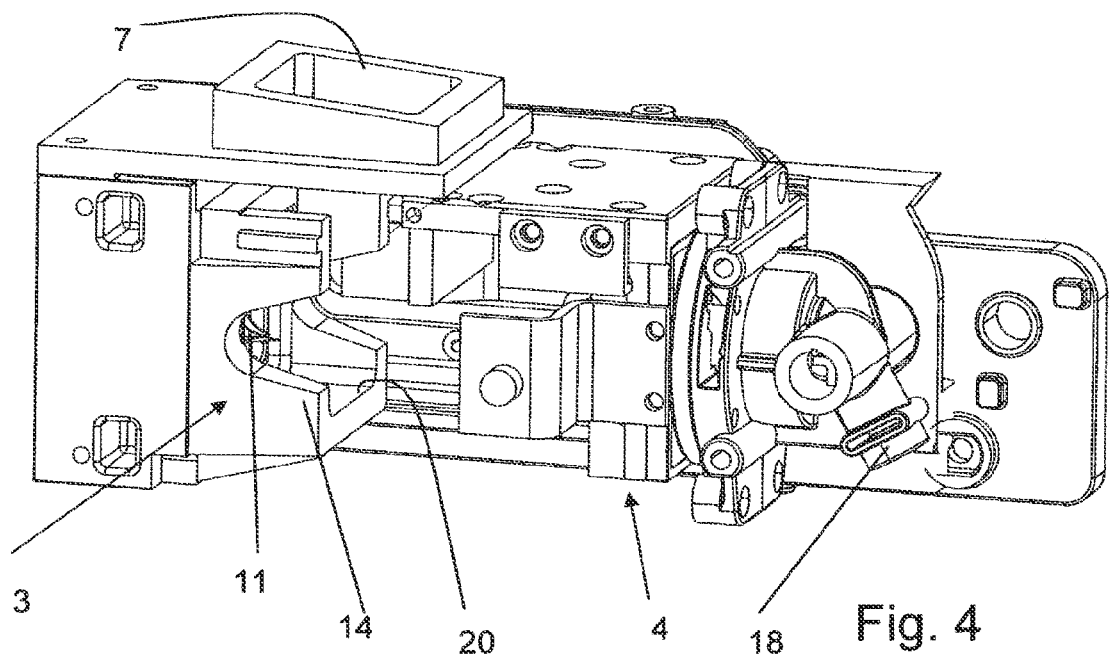
FIG. 4 is an elevation view of an alternative brewing module, wherein the structure of the brewing module is only partly represented.

FIG. 4 show a variant of the brewing module, with which the approximately cube-shaped capsule 15 which is inserted into the open brewing chamber is supported by a support 20 of the brewing chamber, said support together with lateral walls 14, the end-surface of the discharge device which comprises the piercing tips 11 of the discharge device, and elements of the introduction device 4, forming the brewing chamber. The brewing module according to FIG. 4 with the exception of the sealing system corresponds to the brewing module described in the patent application PCT/CH2010/000099, whose teaching is expressly referred to here.

Figure 5:
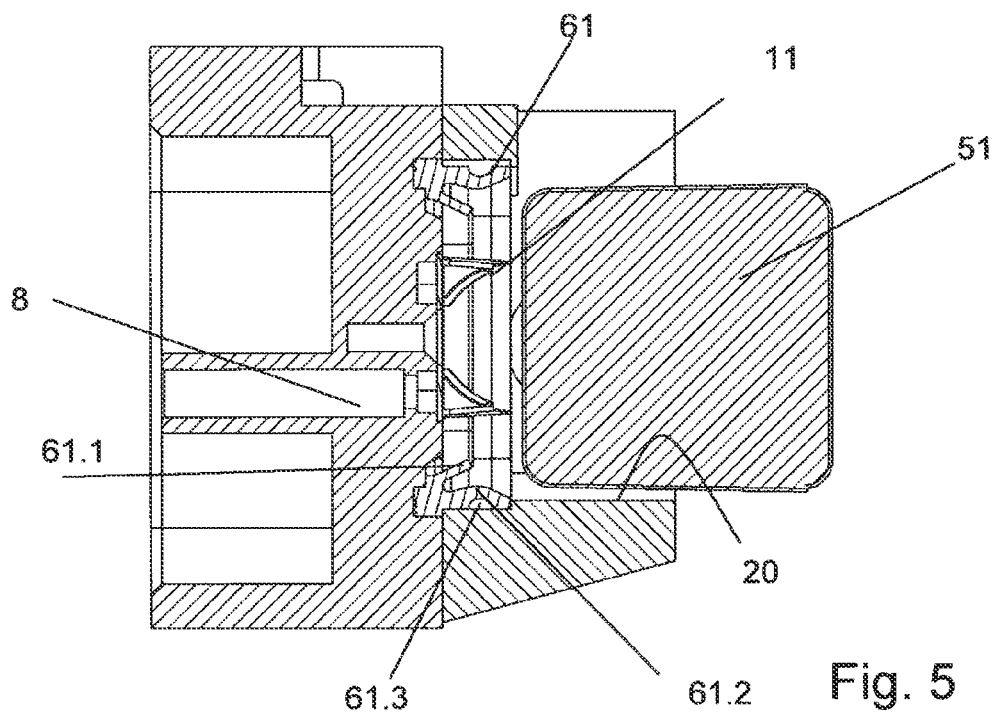
FIG. 5 is a partial sectional plan view of the discharge device of the brewing module according to FIG. 4, with a capsule.
Figure 6:
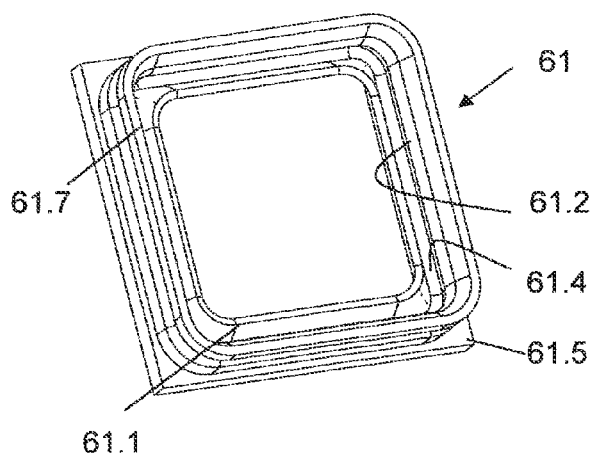
FIG. 6 is a perspective view of a first embodiment of a seal, in particular for the discharge device.

FIG. 5 shows the discharge device of the brewing module of FIG. 5 with a schematically represented capsule 51, in section. The seal 61 can be clearly seen and is also represented in FIG. 6. This comprises an inwardly projecting, circumferential sealing lip 61.1 which bears on the face-side of the capsule 51. A sealing bead 61.2 as a further sealing step bears along a circumferential surface of the capsule. In the represented embodiment, the seal in the region of the sealing bead 61.2 comprises an optional outer notch 61.3 which increases the elasticity of the seal in the region of the sealing bead 61.2. A pronounced trough 61.4 is formed between the sealing lip and the sealing bead—thus the region of the rounded edge of the capsule, and even with a strong pressing of the capsule against the discharge device, this trough forms a cavity between the sealing lip 61.1, the sealing bead 61.2 and the capsule 51. A seal flange 61.5 serves the fastening in the brewing module.

Figure 7:
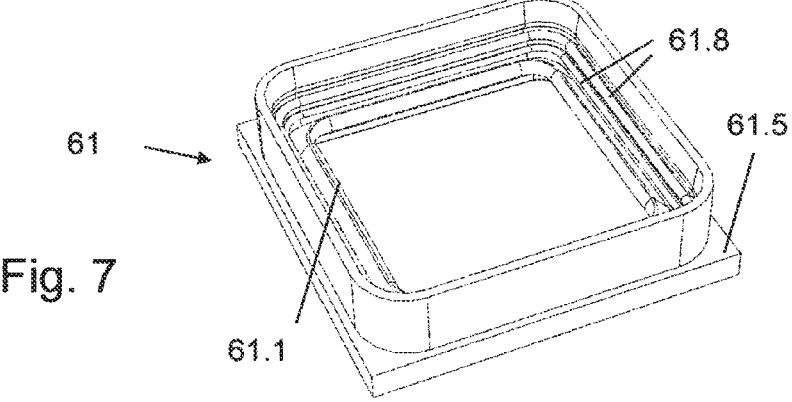
FIG. 7 is a perspective view of a second embodiment of a seal, likewise particularly suitable for the discharge device.
Figure 8:
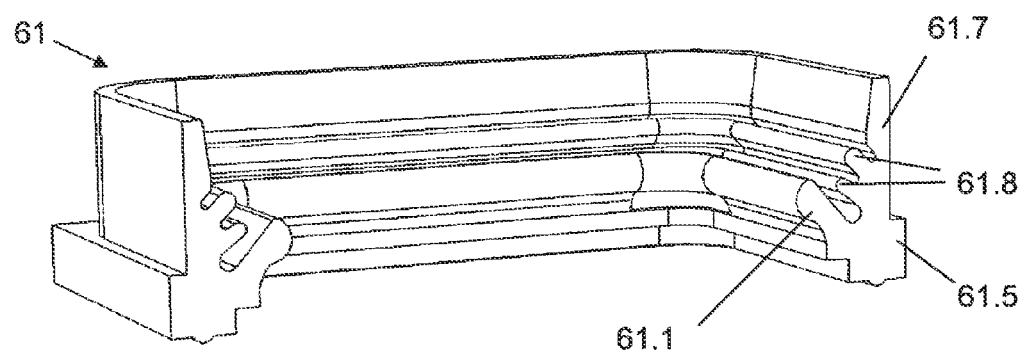
FIG. 8 is a sectional elevation view of the seal according to FIG. 7.

A further embodiment example of a seal for the discharge device is represented in FIGS. 7 and 8. This seal corresponds to the seal of the discharge device 3 of the brewing module according to FIG. 1. As the previously described seal, this seal 61 also comprises a seal collar 61.7 which encompasses the capsule 51. Additionally to the (first) sealing lip 61.1 which collars proximally on the seal collar 61.7, projects inwardly and bears on the end-face of the capsule 51, the seal 61 comprises two further sealing lips 61.8 which bear on the capsule in the region of its edge. In particular, the sealing lips 61.8 can be arranged such that they lie on both sides of the stiffening welding brow 51.1, which in particular results in a particularly good stability and sealing effect.

The injection-side seal 62 of the brewing module according to FIG. 1 is yet represented in FIGS. 9 and 10. Additionally to the inwardly projecting first sealing lip 62.1 bearing on the end-face of the capsule, a plurality of second, encompassing sealing lips 62.9 is present on a seal collar 62.7. In the shown embodiment example, there are four such sealing lips 62.9, and in other embodiments two, three, five or even more such (or other) sealing lips are present. Preferably, the number is 2-5 and in particular 3-5. As with the extraction-side seal 61, the injection-side seal 62 in the shown embodiment also comprises a fastening flange 62.5.

The second sealing lips in contrast to the first sealing lip 61.1 and to the further sealing lips 61.8 of the extraction-side seal 61 have a relatively high stiffness on account of their geometry, by which means they can exert a relatively large elastic force without such a force bearing from the outside, onto an encompassed capsule and hold this. In the drawn embodiment example, the second sealing lips are saw-tooth shaped with a distally (i.e. away from the direction, from which the brewing fluid is injected) projecting lip rear 62.10. This form likewise has the effect that the pressure of the brewing fluid from the proximal side against the roughly perpendicular surfaces 62.11 presses the sealing lips even greater against the capsule wall. In contrast to inwardly projecting lips which tend to be somewhat wing-like in cross section as is the case with the first sealing lips 62.1, the saw-tooth shape however effects the mentioned stiffness.

In each case, an extraction-side seal 61 and an injection-side seal 62 as can be applied for non-cubic, but circularly cylindrical, barrel-shaped or beaker-shaped capsules are represented in FIGS. 11 and 12. In the figures, one can clearly see the shape which is rotationally symmetrical about the capsule axis, in contrast to the FIGS. 8 and 10.

Figure 13:
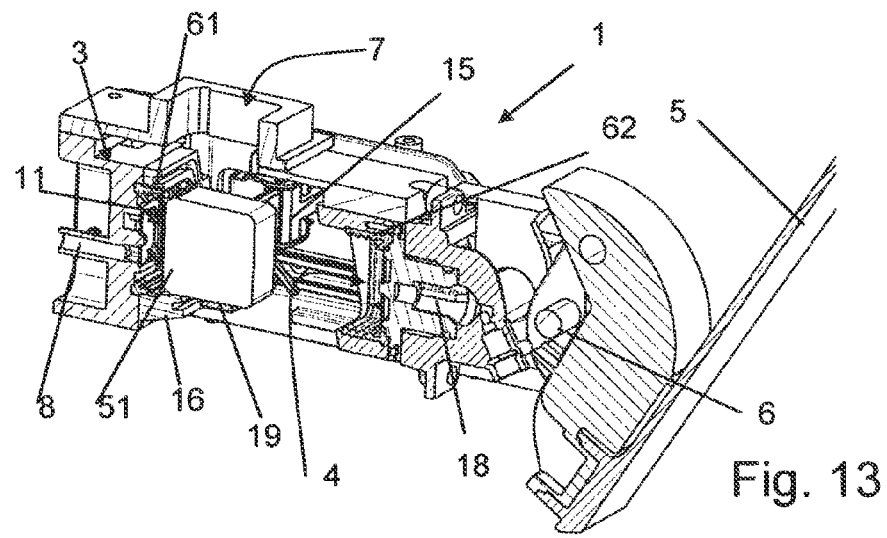
FIG. 13 is a is a partial sectional elevation of the brewing module according to FIG. 1, sectioned along the longitudinal plane.

Embodiments of the extraction material according to the invention are designed such that the injection-side seal 62 holds the capsule on opening the brewing chamber and pulls it out of the extraction-side piercing tips and out of the extraction-side, encompassing seal 61, so that the capsule falls into the capsule container 75 after use. This is illustrated in FIGS. 13-15.

FIG. 1 shows the initial position of the brewing module without an inserted capsule. A capsule 51 has been inserted through the insert opening 7 in FIG. 13 and rests on the movable capsule support 19 and the support portion 16 of the discharge device 3. Subsequent to this, by way of a movement of the operating lever 5, the introduction device 4 is displaced to the capsule 51 and to the discharge device 3, by which means the injection-side seal 62 is pushed over the capsule, and the capsule pushed against the discharge device and is pierced on the injection side as well as the extraction side. With the relative movement which thus closes the brewing chamber, the capsule support can also be displaced away from the capsule, as soon as the capsule is encompassed by the injection-side seal and is held in its position by way of this. The brewing process takes place subsequently to the closure of the brewing chamber, in which brewing process the brewing fluid is introduced under pressure into the capsule, and the brewing drink is led out of the capsule on the extraction side.

Figure 14:
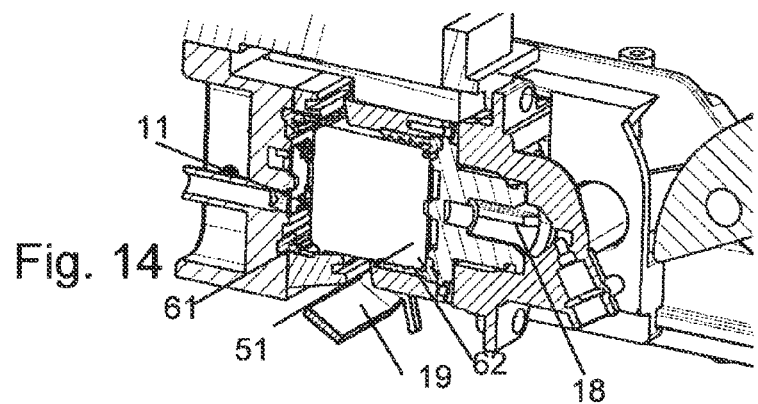
FIG. 14 is a is a partial sectional elevation of the brewing module according to FIG. 1, sectioned along the longitudinal plane.
Figure 15:
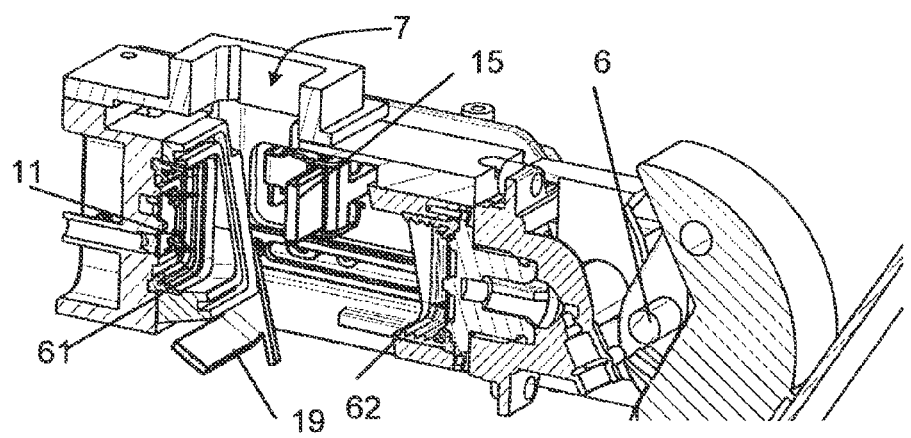
FIG. 15 is a is a partial sectional elevation of the brewing module according to FIG. 1, sectioned along the longitudinal plane.

FIG. 14 shows the brewing module with the capsule 15 at the beginning of the relative movement of the introduction device and discharge device, said relative movement opening the brewing chamber and being effected again with a pivoting movement of the operating lever. The injection-side seal 62 holds the capsule and pulls it out of the extraction-side piercing tips 11 and the extraction-side seal 61. With the continuation of the movement further from the position according to FIG. 14 to the right in the direction of the position according to FIG. 15, the capsule is gripped by the wiper means 15 and its movement relative to the introduction device which continues to move is blocked, by which means the capsule is also pulled out of the injection-side seal 62. The capsule can fall downwards into the capsule container 75 since the capsule support 19 is displaced out of the initial position. FIG. 15 shows the situation with an opened brewing chamber, before the capsule support 19 is displaced back into the initial position.

In the illustrated embodiment, the brewing module is of the "horizontal brewing module" type. However, other embodiments are also possible. In particular, the extraction apparatus can also be of the "piston machine" type, in which the discharge device or possibly the introduction device is integrated in a piston which is fastenable on a stationary part of the extraction apparatus, in order to form the brewing chamber.

The invention claimed is:

1. An extraction apparatus, with a brewing module for receiving a capsule with a capsule wall and with an extraction material in a capsule interior, wherein the brewing module comprises a first brewing module part and a second brewing module part, said second brewing module part being movable relative to the first brewing module part, wherein the first and the second brewing module parts form a discharge device for the discharge of an extraction product out of the capsule, and an introduction device for introducing an extraction fluid into the capsule, wherein the introduction device comprises at least one piercing tip for piercing the capsule, wherein the introduction device is provided with an elastically deformable, injection-side seal that surrounds the at least one piercing tip of the introduction device and that comprises a seal collar encompassing the capsule in a positioning and holding manner and at least one circumferential sealing lip and/or circumferential sealing bead, wherein the at least one sealing lip or the at least one sealing bead bears on a surface of the capsule in a line-like or strip-like manner and presses the capsule wall against the capsule interior.

2. The extraction apparatus according to claim 1, wherein the discharge device comprises an extraction-side seal with at least one circumferential sealing lip and/or circumferential sealing bead, wherein the sealing lip or the sealing bead bears in a line-like or strip-like manner on a surface of the capsule and presses the capsule wall against a capsule interior.

3. The extraction apparatus according to claim 1, wherein at least one sealing lip and/or sealing bead encompasses the capsule along a circumferential surface and thereby on account of its elasticity is pressed against the capsule wall in such a manner that the capsule is held by the seal.

4. The extraction apparatus according to claim 1, wherein the injection-side seal or at least one of the seals comprises a plurality of circumferential sealing lips and/or sealing beads that, on account of their elasticity, press the capsule wall against a capsule interior,
   whereby in each case a recess is arranged between consecutive sealing lips or sealing beads such that a circumferential cavity is formed between the consecutive sealing lips or sealing beads and the capsule, in the operating condition.

5. The extraction apparatus according to claim 1, wherein at least one of the circumferential sealing lips or the sealing beads is pressed against an end-face of the capsule, and at least one of the circumferential sealing lips or sealing beads is pressed against a circumferential surface.

6. The extraction apparatus according to claim 5, wherein a plurality of circumferential sealing lips or sealing beads is pressed against a circumferential surface,
   wherein in each case a recess is arranged between consecutive sealing lips or sealing beads in such a manner such a circumferential cavity is formed between the consecutive sealing lips or sealing beads and the capsule, in the operating position.

7. The extraction apparatus according to claim 4, wherein the consecutive sealing lips have a saw-tooth shape in cross section.

8. The extraction apparatus according to claim 1, wherein the introduction device comprises at least one fluid introduction opening which is spatially separated from the at least one piercing tip.

9. The extraction apparatus according to claim 1, wherein the injection-side seal encompasses the capsule and holds this alone on account of the elasticity of the seal, so that on opening the brewing chamber, the capsule is pulled out of extraction-side piercing tips on account of the holding effect of the seal.

10. The extraction apparatus according to claim 9, further comprising a stripping device for releasing the capsule from the injection-side seal.

11. The extraction apparatus according to claim 1, wherein the brewing module is a horizontal brewing module.

12. The extraction apparatus according to claim 1, wherein the injection-side seal or at least one of the seals comprises an outwardly projecting fastening flange.

13. A coffee or tea brewing system comprising an extraction apparatus according to claim 1, as well as a portion capsule with extraction material, wherein the brewing module forms a brewing chamber whose dimensions are matched to the portion capsule.

14. A seal for an extraction apparatus according to claim 1, comprising at least one circumferential sealing lip and/or a circumferential sealing bead, wherein the at least one sealing lip or the at least one sealing bead bears in a line-like or strip-like manner on a surface of a capsule with an extraction material received in a capsule interior, and presses the capsule wall against the capsule interior.

* * * * *